(12) United States Patent
Struble (10) Patent No.: US 7,142,333 B2
(45) Date of Patent: Nov. 28, 2006

(54) SYSTEM AND METHOD FOR WIRELESSLY INITIATED DOCUMENT SCANNING AND TRANSMISSION

(75) Inventor: Christian L. Struble, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 812 days.

(21) Appl. No.: 09/888,350

(22) Filed: Jun. 21, 2001

(65) Prior Publication Data
US 2002/0196478 A1 Dec. 26, 2002

(51) Int. Cl.
H04N 1/00 (2006.01)
H04N 1/04 (2006.01)

(52) U.S. Cl. ............... 358/402; 358/400; 358/474; 705/14; 705/26; 455/556.1; 379/100.09

(58) Field of Classification Search .......... 358/1.1–1.9, 358/402, 403, 1.11–1.18, 468, 474, 442, 434, 358/438, 400, 407, 448, 483; 455/89, 33.1, 455/41.3, 500, 517, 556.1, 556.02, 95, 420, 455/550.01, 11.1; 382/312–319; 379/59, 379/88.13, 88.14, 93.24, 88.22, 100.09; 709/200–203, 709/216–253; 345/760, 864, 810; 705/14, 705/26
See application file for complete search history.

(56) References Cited

U.S. PATENT DOCUMENTS

| | | | |
|---|---|---|---|
| 5,481,249 A | 1/1996 | Sato | |
| 5,499,108 A * | 3/1996 | Cotte et al. | 358/400 |
| 5,524,185 A | 6/1996 | Na | |
| 5,862,321 A * | 1/1999 | Lamming et al. | 709/200 |
| 5,995,593 A * | 11/1999 | Cho | 379/56.3 |
| 6,055,062 A | 4/2000 | Dina et al. | |
| 6,081,629 A * | 6/2000 | Browning | 382/313 |
| 6,163,538 A | 12/2000 | Brown et al. | |
| 6,167,514 A | 12/2000 | Matsui et al. | |
| 6,189,788 B1 | 2/2001 | Sherman et al. | |
| 6,198,920 B1 | 3/2001 | Doviak et al. | |
| 6,215,475 B1 | 4/2001 | Meyerson et al. | |
| 6,226,098 B1 | 5/2001 | Kulakowski et al. | |
| 6,229,621 B1 | 5/2001 | Kulakowski et al. | |

* cited by examiner

Primary Examiner—Thomas D. Lee
Assistant Examiner—Heather D Gibbs

(57) ABSTRACT

A method of document scanning comprises wirelessly communicating a request, initiated by a mobile computing device, to a scanner to image a paper document into an electronic document. After imaging the paper document with the scanner to produce an electronic document, the method includes sending the electronic document from the scanner to a document server identified by the mobile computing device.

A document scanner comprises an imaging mechanism configured for creating an electronic document from a paper document and a wireless communication module configured for wirelessly receiving an imaging request from a mobile computing device and for sending the electronic document to a document server based on the imaging request.

10 Claims, 6 Drawing Sheets

SYSTEM AND METHOD FOR WIRELESSLY INITIATED DOCUMENT SCANNING AND TRANSMISSION

THE FIELD OF THE INVENTION

The present invention relates to document imaging and in particular, to wirelessly initiated document imaging and transmission.

BACKGROUND OF THE INVENTION

With the use of a document scanner, almost anyone can conveniently transform a paper document into an electronic one. Once the electronic document is created, the electronic document can be stored, printed back into a paper document, or be sent electronically via email or facsimile to a desired recipient. Document scanners are commonly supported by a desktop or network computer, and also can be incorporated into a multifunction printer that also includes the ability to copy and/or print the document.

Scanning a document conventionally requires access to a desktop computer or network computing station to operate the scanner and to control the electronic document created by the scanner. For a traveler or guest, access or exposure to the computer associated with the scanner may not be possible or even desirable. The traveler/guest likely lacks adequate control over the situation to insure the confidentiality of the document. For example, while a traveler or guest could ask their host to scan a document and provide the traveler with an electronic copy, the traveler may want to avoid the possibility of the host retaining an electronic copy of the document. Even where confidentiality is not an issue, the traveler/guest may simply want to hasten the document scanning process by initiating and completing the process alone.

Accordingly, widespread use of conventional scanning systems by travelers, guest or other mobile computing users, is limited by the dual concerns of convenience and confidentiality.

SUMMARY OF THE INVENTION

A method of document scanning of the present invention comprises wirelessly communicating a request, initiated by a mobile computing device, to a scanner to image a paper document into an electronic document. After imaging the paper document with the scanner to produce an electronic document, the method includes sending the electronic document from the scanner to a document server identified by the mobile computing device.

A document scanner of the present invention comprises an imaging mechanism and a wireless communication module. The imaging mechanism is configured for creating an electronic document from a paper document. The wireless communication module is configured for wirelessly receiving an imaging request from a mobile computing device and configured for sending the electronic document to a document server based on the imaging request.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Components of the present invention may be implemented in hardware via a microprocessor, programmable logic, or state machine, in firmware, or in software within a given device. In one aspect, at least a portion of the software programming is web-based and written in HTML and JAVA programming languages, including links to graphical user interfaces, such as via windows-based operating system. The components may communicate via a network using a communication bus protocol. For example, the present invention may or may not use a TCP/IP protocol suite for data transport. Other programming languages and communication bus protocols suitable for use with the present invention will become apparent to those skilled in the art after reading the present application. Components of the present invention may reside in software on one or more computer-readable media. The term computer-readable media as used herein is defined to include any kind of memory, volatile or non-volatile, such as floppy disks, hard disks, CD-ROMs, flash memory, read-only memory (ROM), and random access memory (RAM).

Preferably, the user interfaces described herein run on a controller, computer, appliance or other device having an operating system which can support one or more applications. The operating system is stored in memory and executes on a processor. The operating system is preferably a multi-tasking operating system which allows simultaneous execution of multiple applications, although aspects of this invention may be implemented using a single-tasking operating system. The operating system employs a graphical user interface windowing environment which presents the applications or documents in specially delineated areas of the display screen called "windows." Each window has its own adjustable boundaries which allow the user to enlarge or shrink the application or document relative to the display screen. Each window can act independently, including its own menu, toolbar, pointers, and other controls, as if it were a virtual display device. Other software tools may be employed via the window, such as a spreadsheet for collecting data. The operating system preferably includes a windows-based dynamic display which allows for the entry or selection of data in dynamic data field locations via an input device such as a keyboard and/or mouse. One preferred operating system is a Windows® brand operating system sold by Microsoft Corporation. However, other operating systems which provide windowing environments may be employed, such as those available from Apple Corporation or IBM. In another embodiment, the operating system does not employ a windowing environment.

Figure 1:
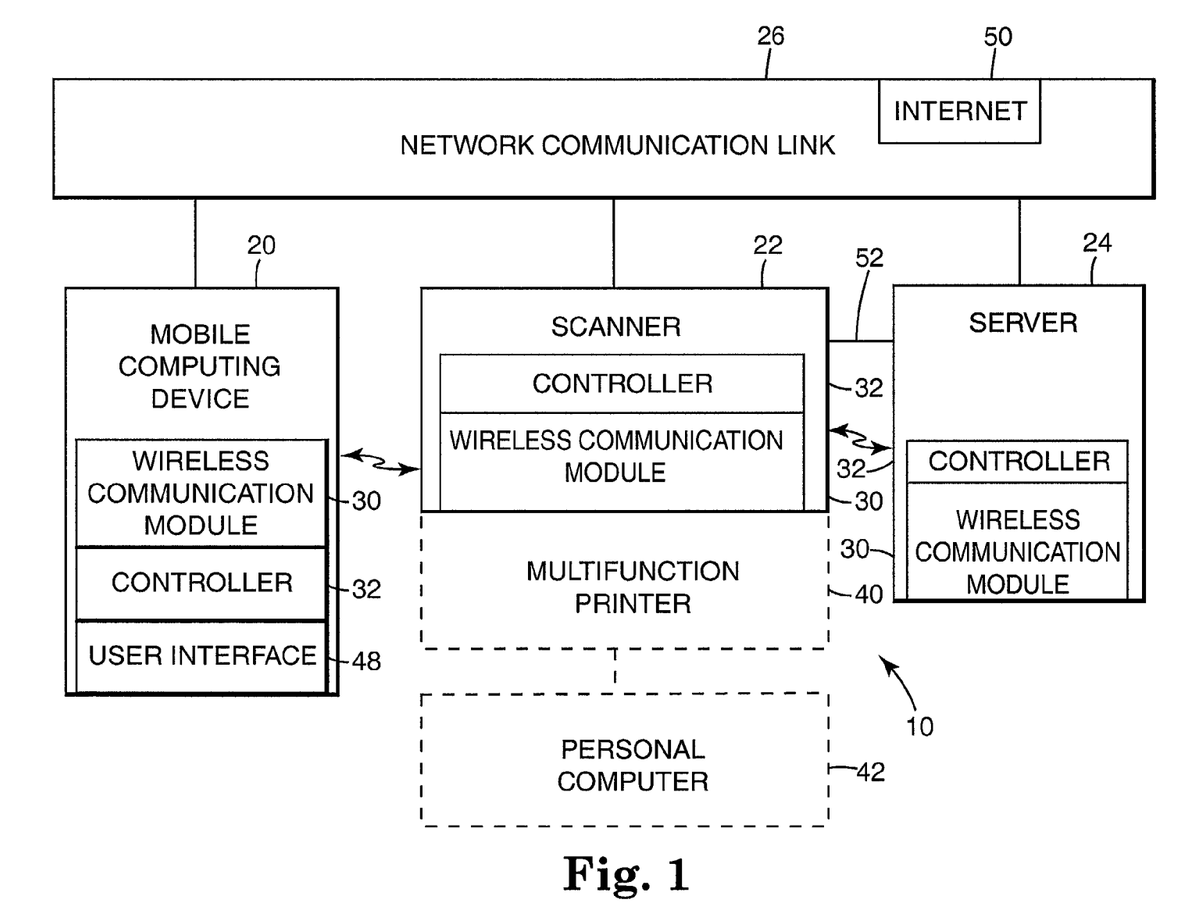
FIG. 1 is a block diagram of a document scanning system, according to one embodiment of the present invention.

A wirelessly activated document scanning system and method according to the present invention is illustrated generally at 10 in FIG. 1. System 10 includes mobile computing device 20, scanner 22, server 24, each of which includes wireless communication module 30 and controller 32. System 10 further includes network communication link 26. Scanner 22 further optionally forms a portion of multi-function printer 40 and optionally is connected to personal computer 42. Multi-function printer 40 includes the ability to copy documents as well as send electronic documents by facsimile or electronic mail.

Mobile computing device 20 is preferably configured as a handheld or notebook computer, personal digital assistant, or mobile phone, each being configured for wireless communication via wireless communication module 30. Mobile computing device 20 includes user interface 48 to assist in operating system 10.

Scanner 22 includes any device capable of capturing an image of a paper document and transforming it into an electronic form, such as an electronic document, that can be stored digitally and/or electronically transported to a recipient (via email, facsimile, or diskette). Scanner 22 includes flatbed scanners, document feed scanners, handheld scanners, as well as multi-function machines incorporating a scanning module. Scanner 22 is programmable to permit selective functioning with, and wireless communication with, mobile computing device 20 and server 24.

Network communication link 26, as used herein, includes an internet communication link (e.g., the Internet), an intranet communication link, or similar high-speed communication link. In one preferred embodiment, network communication link 26 includes an Internet communication link 50. Network communication link 26 facilitates communication between mobile computing device 20, scanner 22, and server 24, including wireless network communication such as wireless internet or intranet communication.

Wireless communication between mobile computing device 20, scanner 22, and server 24 is accomplished using wireless communication module 30 with one or more known communication and application protocols such as Wireless Application Protocol (WAP), Bluetooth, Infrared (IrDA, FIR), 802.11 as well as other communication and application protocols known to those skilled in the art. Of particular interest are wireless communication protocols such as infrared (e.g., FiR), Bluetooth, and 802.11 which permit short range direct radio or beamed communication between two or more compatible devices that operate independently of a network and independently of network communication link 26. This feature permits direct one-on-one communication between two similarly configured computing devices without any communication intermediary. In the example of the Bluetooth protocol, the communication link preferably is established by the mere presence of each respective device (e.g., mobile computing device 20 and scanner 22) in close proximity to each other. This instant synchronization enables users to immediately communicate with each other without taking time to manually establish a connection or communication link. If necessary, mobile computing device 20, scanner 22, and server 24 optionally communicate with each other through more conventional indirect routes such as wireless network or internet links, or wireless telecommunications networks. Finally, scanner 22 optionally is directly connected to server 24 via direct communication link 52.

Controller 32 includes hardware, software, firmware or combination of these. In one preferred embodiment, controller 32 includes a computer server or other microprocessor based system capable of performing a sequence and logic operations. In addition, controller 32 can include a microprocessor embedded systems/appliance incorporating tailored appliance hardware and/or dedicated single purpose hardware.

Figure 2:
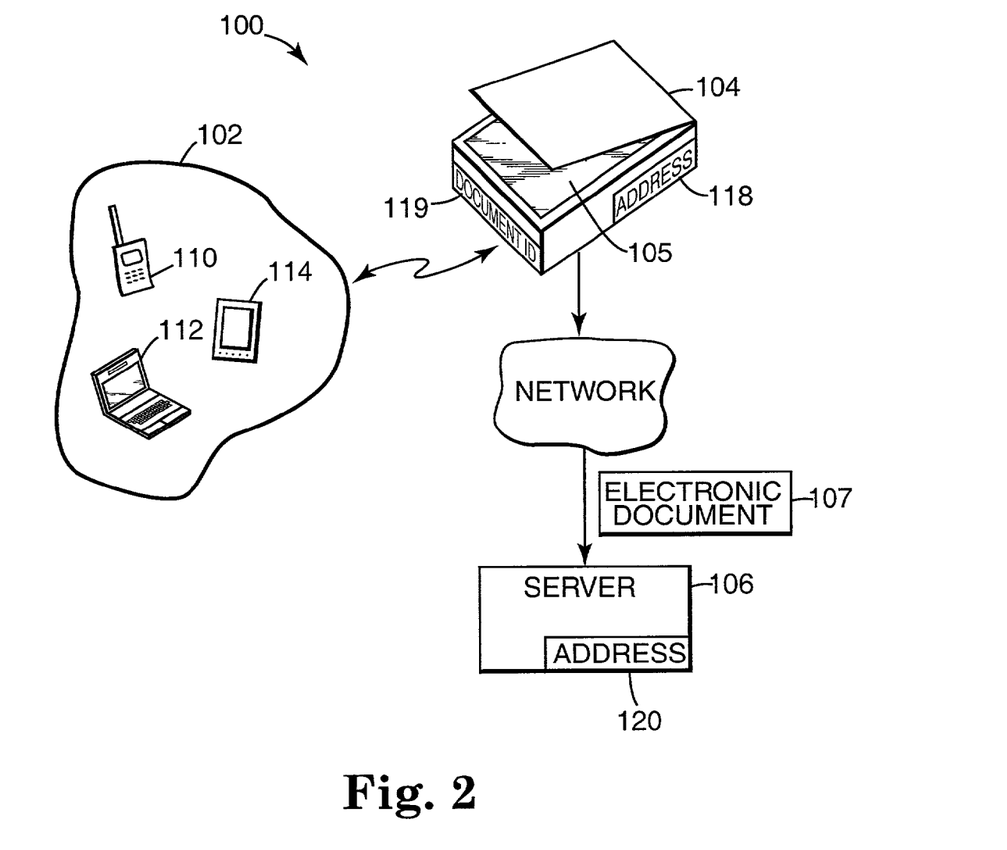
FIG. 2 is a schematic illustration of a document scanning system, according to one embodiment of the present invention.

As shown in FIG. 2, scanning system 100 of the present invention includes mobile computing device(s) 102, scanner 104, paper document(s) 105, server 106, and electronic document(s) 107. Mobile computing device 102 further includes any one of mobile phone 110, portable computer 112, and personal digital assistant (PDA) 114. Mobile computing device 102, scanner 104, and server 106 each have substantially the same features and attributes of mobile computing device 20, scanner 22, and server 24, respectively. Both scanner 104 and server 106 have an electronic address 118 and 120, respectively, for sending and receiving electronic communications, while scanner 104 tracks a document identifier 119 for paper document(s) 105.

Figure 3:
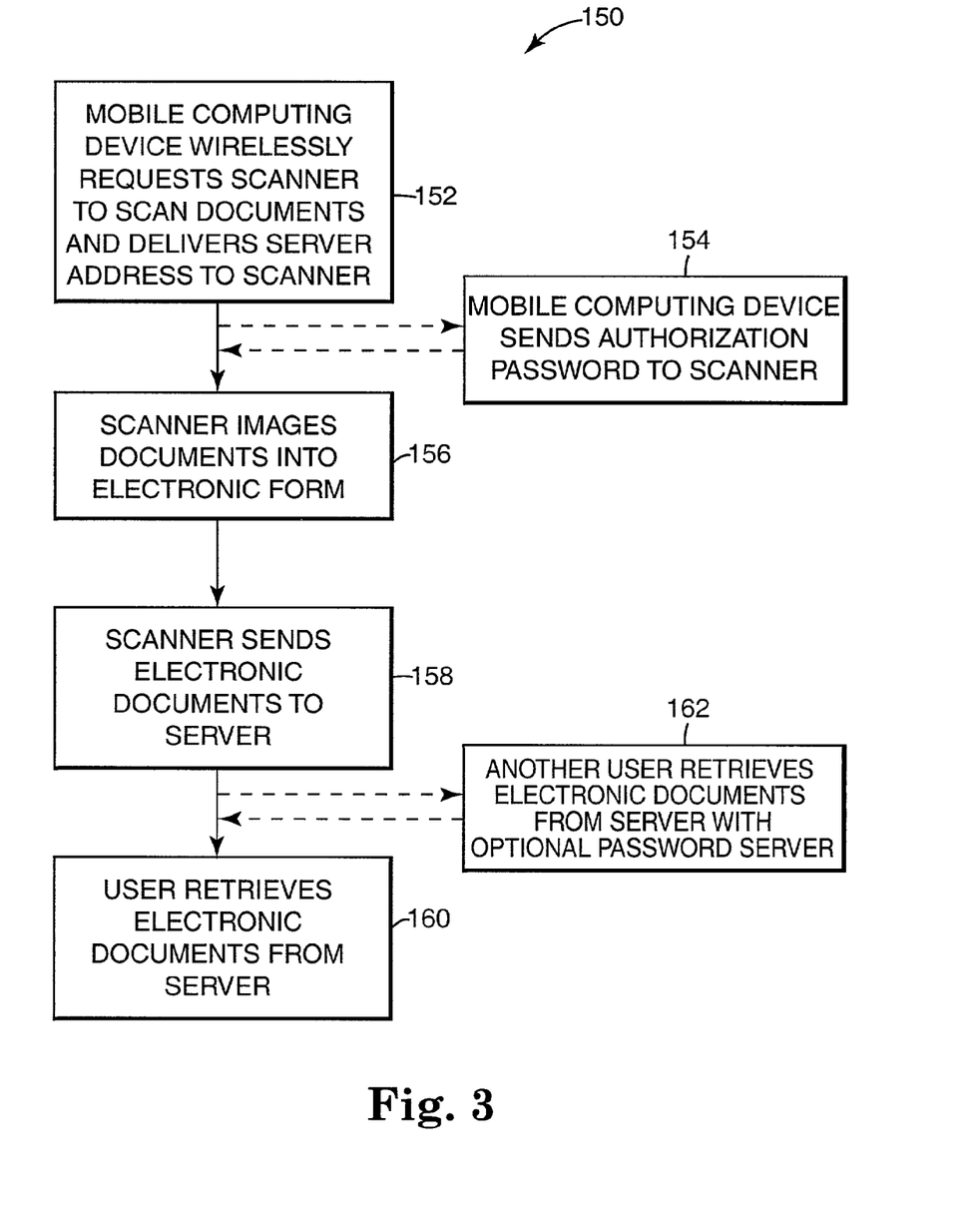
FIG. 3 is a flow diagram of a document scanning method, according to one embodiment of the present invention.

Scanning system 100 is used in a method of wirelessly initiated scanning, according to one embodiment of the present invention. As shown in FIG. 3, in a first step 152 of method 150, mobile computing device 102 wirelessly requests scanner 104 to scan paper document(s) 105 and delivers server address 120 to scanner 104. Wireless communication with scanner 104 preferably occurs by direct communication via radio or infrared protocols, as previously described for wireless communication module 30. Next, scanner 104 images paper documents 105 into electronic document(s) 107 (step 156). Scanner 104 then sends electronic document(s) 107 to server 106 (step 158), which may be through wired or wireless communication. Scanner 104 optionally can also send a password to server 106 to access server 106, if required. Finally, the user retrieves electronic document(s) 107 from server 106 (step 160). Method 150 is characterized by mobile computing device 102 causing scanner 104 to push electronic document(s) 107 to server 106.

Method 150 optionally includes another step 154 prior to step 156, in which mobile computing device 102 sends an authorization password to scanner 104 to gain access to scanner 104. In method 150, the user also can optionally provide the server address 120 to another user to allow the other user to retrieve electronic document(s) 107 from server 106 (step 162). In the latter case, a second optional password can be required to server 106 to insure that only authorized access is granted to server 106.

Figure 4:
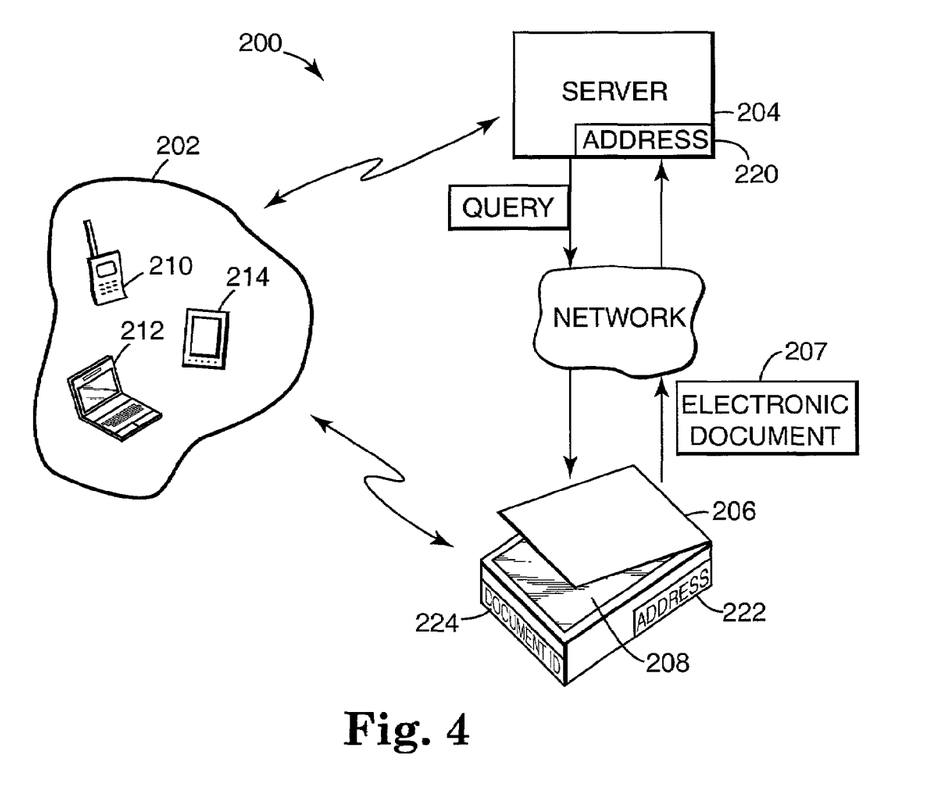
FIG. 4 is a schematic illustration of an alternate document scanning system, according to one embodiment of the present invention.

In another embodiment, as shown in FIG. 4, system 200 includes mobile computing device 202, server 204, scanner 206, electronic document(s) 207, and paper document(s) 208. Mobile computing device 202 further includes any one of mobile phone 210, portable computer 212, and personal digital assistant (PDA) 214. Mobile computing device 202, scanner 206, and server 204 each have substantially the same features and attributes of mobile computing device 20, scanner 22, and server 24, respectively. Both server 204 and scanner 206 have an electronic address 220, and 222, respectively, for sending and receiving electronic communications, while documents 207,208 have corresponding document identifier 224 tracked by scanner 206.

Figure 5:
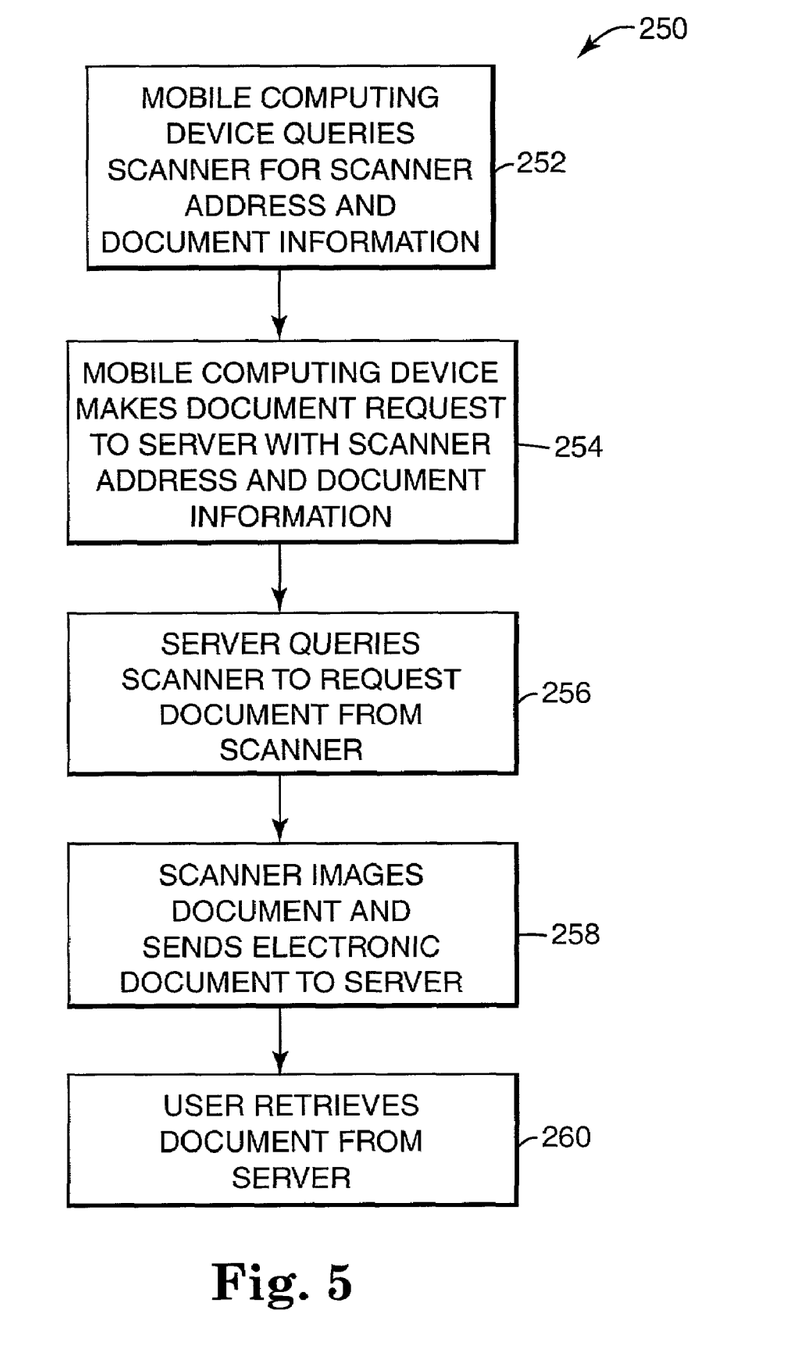
FIG. 5 is a flow diagram of an alternate document scanning method, according to one embodiment of the present invention.

As shown in FIG. 5, a method 250 of the present invention of scanning using system 200, includes a first step 252 in which mobile computing device 202 makes a short range wireless query of scanner 206 for address 222 of scanner 206 and for identifier 224 for document(s) 208. This communication preferably occurs wirelessly through short range direct radio or infrared communication, as previously described for wireless communication module 30.

Next, mobile computing device 202 makes a document request to server 204, supplying server 204 with scanner address 222 and document identifier 224 (step 254). This communication preferably occurs through one or both of wired and wireless communication protocols, such as through network communication link 26. For example, mobile computing device 202 can be wirelessly connected to network communication link 26 while server 204 is connected to network communication link 26 via wired land line communication. In addition, this communication is preferably a long range communication as distinguished from short range direct radio or infrared communication.

With this document request, server 204 queries scanner 206 to request electronic document(s) 207 from scanner 206 (step 256). In response, scanner 206 images paper document(s) 208 and sends electronic document(s) 207 to server 204 (step 258). Communication between server 204 and scanner 206 occurs through one or both of long range wired and wireless communication protocols, such as through network communication link 26. Finally, the user retrieves electronic document(s) 207 from server 204 (step 260). Method 250 is characterized by mobile computing device 202 causing server 204 to pull electronic document(s) 207 from server 206.

Methods 150 and/or 250 can be used where a user wants to transport a document from a first location, which is in the vicinity of the scanner, to a second location, which is located remotely from the scanner, such as another building, city, state or country. The user may be unauthorized to take paper documents 105, 208 with them, or may desire not to do so, because of the bulk or nature of the documents (e.g. confidentiality). The user provides paper documents 105, 208 and with physical access to scanner 104, 206, arranges for imaging of paper documents 105, 208. The user uses mobile computing device 102, 202 to provide server address 120, 220 to scanner 104, 206, with the server address 120, 220 corresponding to the second location (e.g. home, office, other destination). After scanning, electronic document(s) 107, 207 are sent to server 106, 204 for retrieval at the convenience of the user, or another person notified and authorized by the user.

Finally, if necessary, the user can initiate and/or control scanning method 150, 250 from a remote location not in close physical proximity to scanner 104, 206. In this embodiment, mobile computing device 102, 202 preferably communicates with scanner 104, 206 via network communication link 26 using wired and/or wireless communication protocols. The user scans paper documents 105, 208 in scanner 104, 206 and then moves to a remote location before scanner 104,206 sends electronic document(s) 107, 207 to server 106, 204. Alternatively, the user places the paper documents in scanner 104, 206 and then moves to a remote location before initiating the scanning method 150, 250 or requests another person to place the documents in scanner 104, 206 while the user initiates scanning while in the remote location. At a desired point in time, the user wirelessly initiates the scanning and sending commands from mobile computing device 102, 202 to scan paper documents 105, 208 and send them to server 104, 206. This embodiment is useful when the user desires to delay delivery of electronic document(s) 107, 207 to server 106, 204 until a later point in time. For example, when the user or another person authorized by the user is ready to retrieve electronic document(s) 107,207. This technique may be used by the user to limit the amount of time that electronic document(s) 107, 207 are posted on server 106, 204, or are used to provide another user access to electronic document(s) 107, 207 at server 106, 204 after a specified point in time.

In either method 150 or 250, electronic document(s) 107, 207 can be temporarily stored in a buffer or other memory of scanner 104, 206 so that the imaging of paper documents 105, 208 into electronic document(s) 107, 207 can take place a substantial period of time before electronic document(s) 107, 207 are sent to server 106, 204. In addition, in either method 150 or 250, server address 120, 220 and document identifier 119, 224 optionally are erased from scanner 104, 206 after electronic document(s) 107, 207 are sent to server 106, 204 so that no trace remains of which documents were sent and where the documents were sent.

Figure 6:
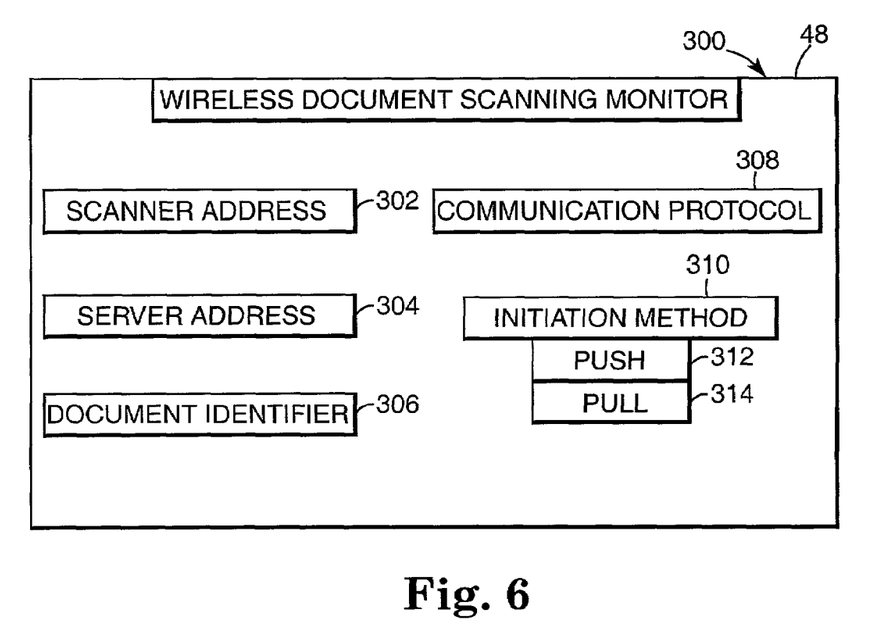
FIG. 6 is a block diagram of a user interface of a document scanning system, according to one embodiment of the present invention.

FIG. 6 illustrates user interface 48 (FIG. 1) operating on mobile computing device 20 for performing method 150 with system 100 or for performing method 250 with system 200. User interface 48 optionally is available for directing communication between mobile computing device 20, scanner 22, and server 24. In one embodiment, user interface 48 includes monitor 300, which includes scanner address function 302, server address function 304, document identifier function 306, communication protocol function 308. Menu 300 also includes initiation method function 310, which includes options for activating either push method 312 or pull method 314. Selection of push method 312 causes document scanning to be performed according to method 150 in which scanner 106 images a document and then pushes electronic document 107 to server 106. In contrast, selection of pull method 314 causes document scanning to be performed according to method 250 in which mobile computing device 202 identifies scanner 206 and instructs server 204 to pull electronic document 207 from scanner 206 to server 204.

User interface 48 can be implemented in hardware via a microprocessor, programmable logic device, or state machine, and firmware, or in software within a given device. In one aspect, at least a portion of the software programming is written in Java programming language, and user interface 48 communicates with other computing devices via network communication link 26 using a communication bus protocol. For example, the present invention optionally can use a TCP/IP protocol suite for data transport. In another aspect, the present invention does not use a TCP/IP protocol suite for data transport. Other programming languages and communication bus protocols suitable for use with user interface 48 and system 10 will be apparent to those skilled in the art.

A system and method of the present invention for wirelessly initiated document scanning carries numerous advantageous features. Foremost, convenience and control are provided, by permitting a mobile computing device to wirelessly instruct a document scanner to image a paper document into an electronic one for transport and storage to a document server. With the document securely sent to the document server for retrieval at the convenience of the user, the user can travel at leisure without the paper documents. The user need not worry about the possibility of misplacing or losing the documents or even theft, and can travel lighter without carrying the documents with them. Moreover, the user can even notify a third party to retrieve the electronic documents from the server.

While specific embodiments have been illustrated and described, herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method of wirelessly activated document transportation comprising:
   wirelessly sending, from a mobile computing device to a scanners, an electronic address of a document server and a request to image a paper document at the scanner;
   imaging the paper document with the scanner, in response to the request from the mobile computing device, to produce an electronic document from the paper document;
   storing the electronic document in a memory of the scanner; and
   sending the electronic document from the scanner to the document server at the electronic address provided by the mobile computing device.

2. The method of claim 1 comprising:
   sending a password from the mobile computing device to the scanner to authorize scanning the paper document.

3. A method of remotely activated scanning comprising:
   imaging a paper document with a first scanner to produce an electronic document from the paper document;
   storing the electronic document in a memory of the first scanner and associating the stored electronic document with a document identifier;
   wirelessly obtaining from the first scanner, via a mobile computing device, the document identifier and an electronic address of the first scanner;
   wirelessly sending directly from the mobile computing device to a document server the electronic address of the first scanner, the document identifier, and a request for the document server to obtain the electronic document from the first scanner;
   querying the first scanner, via the document server, using the electronic address of the first scanner and the document identifier to request the electronic document from the first scanner; and
   sending the electronic document from the first scanner to the document server.

4. A wireless document scanning system comprising:
   a document server;
   a scanner configured to image a paper document into an electronic document and having a wireless communication module configured for sending the electronic document directly from the scanner to the document server; and
   a mobile computing device having a wireless communication module configured for sending a request to the scanner to image the paper document and configured for identifying to the scanner an electronic address of the document server.

5. The scanning system of claim 4, wherein the scanner comprises a multifunction printer configured for copying, scanning, faxing, and emailing documents.

6. The scanning system of claim 4 and further comprising:
   a network communication link configured for facilitating communication between the mobile computing device, the scanner, and the document server.

7. The scanning system of claim 4, wherein the mobile computing device comprises at least one of a personal digital assistant, a portable computer, and a mobile phone.

8. A wireless document scanning system comprising:
   a document server;
   a scanner configured to image a paper document into an electronic document, the scanner including a memory to store the electronic document and a document identifier associated with the stored electronic document, and the scanner including a communication module configured for wirelessly receiving a request from the document server to obtain the electronic document and configured for sending the electronic document directly from the scanner to the document server; and
   a mobile computing device having a wireless communication module configured to perform the following tasks:
      wirelessly obtaining from the scanner an electronic address of the scanner and a document identifier of the electronic document; and
      wirelessly sending to the document server the electronic address of the scanner and the document identifier and wirelessly sending to the document server a request to the document server to obtain the electronic document at the electronic address of the scanner using the document identifier.

9. A computer-readable medium having computer-executable instructions for performing a method of wirelessly activated document transportation, the method comprising:
   wirelessly sending, from a mobile computing device to a scanner, an electronic address of a document server and a request to image a paper document at the scanner;
   imaging the paper document with the scanner, in response to the request from the mobile computing device, to produce an electronic document from the paper document;
   storing the electronic document in a memory of the scanner; and
   sending the electronic document from the scanner to the document server at the electronic address provided by the mobile computing device.

10. A computer-readable medium having computer-executable instructions for performing a method of remotely activated scanning, the method comprising: comprising:
   imaging a paper document with a first scanner to produce an electronic document from the paper document;
   storing the electronic document in a memory of the first scanner and associating the stored electronic document with a document identifier;
   wirelessly obtaining from the first scanner, via a mobile computing device, the document identifier and an electronic address of the first scanner;
   wirelessly sending from the mobile computing device to a document server the electronic address of the first scanner, the document identifier, and a request to obtain the electronic document from the first scanner;
   querying the first scanner, via the document server, using the electronic address of the first scanner and the document identifier to request the electronic document; and
   sending the electronic document from the first scanner to the document server.

* * * * *

UNITED STATES PATENT AND TRADEMARK OFFICE
CERTIFICATE OF CORRECTION

| | | |
|---|---|---|
| PATENT NO. | : 7,142,333 B2 | Page 1 of 1 |
| APPLICATION NO. | : 09/888350 | |
| DATED | : November 28, 2006 | |
| INVENTOR(S) | : Christian L. Struble | |

It is certified that error appears in the above-identified patent and that said Letters Patent is hereby corrected as shown below:

In column 7, line 10, in Claim 1, delete "scanners," and insert -- scanner, --, therefor.

In column 8, line 44, in Claim 10, after "method comprising:" delete "comprising:".

Signed and Sealed this

Nineteenth Day of May, 2009

JOHN DOLL
*Acting Director of the United States Patent and Trademark Office*